G. O. LEOPOLD.
BALL BEARING.
APPLICATION FILED MAR. 12, 1908.
908,872.
Patented Jan. 5, 1909.
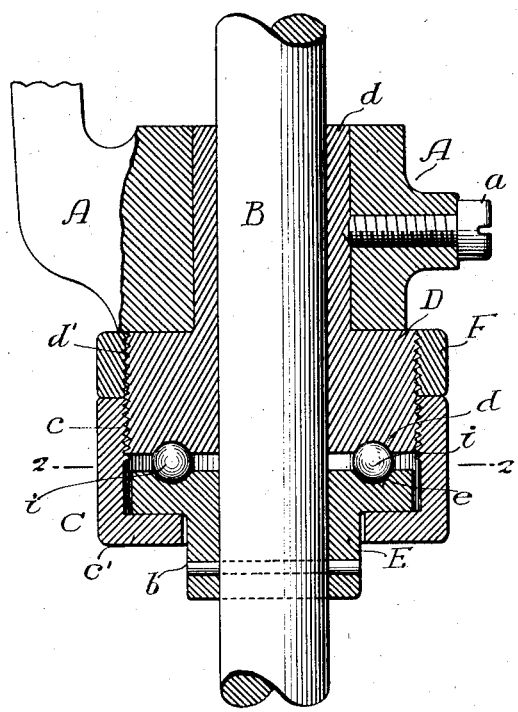
Fig. 1.
Fig. 2.
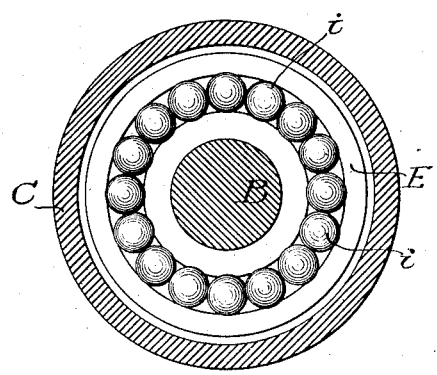
Witnesses:
Walter Chism
Titus H. Ivors
Inventor
George O. Leopold.
by his Attorneys
Howson & Howson

UNITED STATES PATENT OFFICE.

GEORGE O. LEOPOLD, OF PHILADELPHIA, PENNSYLVANIA, ASSIGNOR TO NORTH BROS. M'F'G CO., OF PHILADELPHIA, PENNSYLVANIA, A CORPORATION OF PENNSYLVANIA.

BALL-BEARING.

No. 908,872.  Specification of Letters Patent.  Patented Jan. 5, 1909.

Application filed March 12, 1908. Serial No. 420,531.

*To all whom it may concern:*

Be it known that I, GEORGE O. LEOPOLD, a citizen of the United States, residing in Philadelphia, Pennsylvania, have invented certain Improvements in Ball - Bearings, of which the following is a specification.

The object of my invention is to so construct a ball bearing that the two parts between which the balls are located can be so spaced in reference to each other and to the balls, that the balls will fit the races at all times and that the wear can be readily taken up and the parts held rigidly in the position to which they are adjusted.

My invention is particularly adapted for use in connection with thrust bearings used on small hand tools, such as breast drills, ratchet tools and other devices, but it will be understood that it can be used in other places without departing from the essential features of the invention.

In the accompanying drawing:—Figure 1, is a vertical sectional view illustrating my improved ball bearing attached to one end of a breast drill frame; and Fig. 2, is a sectional plan view on the line 2—2, Fig. 1.

A is a portion of the frame of a breast drill in the present instance.

B is the spindle of the drill which is driven in any suitable manner.

D is the base section of the ball bearing having an extension $d$, which is confined in the frame A by the screw $a$.

E is a bearing plate secured to the spindle B by a pin $b$ or other fastening. The spindle extends through both the plate E and the base section D, as shown.

$i$, $i$ are the balls mounted in annular grooves $d$ and $e$ in the two parts D and E, respectively.

C is a sleeve having a screw threaded portion $c$ adapted to the screw threaded periphery $d'$ of the base section D, and this sleeve has an inwardly extending flange $c'$ resting back of the bearing plate E. On turning this sleeve C upon the screw thread of the base section D in one direction, the plate E is moved towards the base section D, and on turning it in a reverse direction the plate will be free to move in the opposite direction. Thus by adjusting the sleeve the parts can be held in the race-ways with any amount of pressure and any lost motion due to wear can be taken up when desired.

In order to hold the sleeve C in the position to which it is adjusted, I mount on the threaded periphery $d'$ of the base section a threaded ring F, which can be turned and forced in close contact with the end of the sleeve C when it is desired to lock the sleeve in position after adjustment.

I claim:—

1. The combination in a ball bearing, of a base portion having a screw threaded periphery and provided with an extension projecting into a supporting structure, with a bearing plate, a series of balls between the base and the bearing plate, a sleeve having a threaded portion fitting the threaded portion of the base and also having an internal flange engaging the plate, a spindle passing through the base portion and the bearing plate, with means for fixing said spindle to the plate outside the sleeve.

2. The combination with a frame of a bearing, a base portion secured to the frame, said base portion having a race-way in one end and having a threaded periphery, with a bearing plate also having a race-way in line with the race-way of the base, a spindle secured to the plate and extending through it and the base, a series of balls mounted in the race-ways between the base and the plate, a sleeve having a threaded portion adapted to the threaded portion of the base and having an internal flange extending over the back of the plate, and a threaded ring fitting the threaded portion of the base and adapted to rest against the end of the sleeve so as to lock it in the position to which it is adjusted.

In testimony whereof, I have signed my name to this specification, in the presence of two subscribing witnesses.

GEORGE O. LEOPOLD.

Witnesses:
 JOS. H. KLEIN,
 WM. A. BARR.